United States Patent Office 3,516,952
Patented June 23, 1970

3,516,952
CURABLE AND CURED EPOXY-CARBOHYDRATE
POLYETHER RESIN COMPOSITIONS
Hyman M. Molotsky, Chicago, and Edward L. Karraker III, La Grange, Ill., assignors to CPC International Inc., a corporation of Delaware
No Drawing. Filed Apr. 3, 1967, Ser. No. 627,619
Int. Cl. C08b 25/00, 25/02
U.S. Cl. 260—9                                    35 Claims

ABSTRACT OF THE DISCLOSURE

Covers epoxy resin compositions derived from reacting an uncured epoxy resin and a carbohydrate polyether, which compositions have both the desired strength and flexibility as cured coatings or for other uses. Also covers a method of preparing these coatings by curing the reactive epoxy resin and carbohydrate polyether. Lastly, covers coating compositions made up from the reaction product of an epoxy resin, a carbohydrate polyether and an isocyanate and a method of preparing said compositions by curing the just mentioned three ingredients.

---

Epoxy resins as commercially available are uncured intermediate resins or partial polymers which may be generally described as polyethers of low molecular weight having terminal epoxy groups. These resins may be either marketed in the form of viscous liquids or low melting solid polymers commonly known as "lump" resins. The materials are not thermosetting as such, but can be converted to the infusible state by cross-linking with the aid of hardeners or curing agents and heat.

Epoxy resins are useful in a variety of applications. For example, resinous materials of this type are used as insulating coatings and are especially useful for solid dielectric and protective coverings for electrical apparatus. Again, materials of this type have been widely used as binders, coatings, impregnants, adhesives, etc. Toughness and tenacious adhesiveness make epoxy resins singularly suited for these and other applications. In the coating area a primary use of the epoxy resins is in the field of maintenance coating such as coating metal and concrete pipes and tanks.

When used as coatings the epoxy resins are applied to a variety of substrates and then allowed to cure to give hard and fusible films. The curing may take place by means of heat application and/or catalyst promotion. For example, the epoxy may be cured by air-drying through means of an amine type catalyst. This is generally known as the "air-dry system." Another means of forming the cured coating is to oven-cure the epoxy resin in presence of a less active catalyst, such as a urea-formaldehyde type. Such catalytic materials are usually of less basic strength than the amines used in the air-dry system. This second type of curing is known as the "oven-cure system." Thirdly, the cure may be effected in presence of an isocyanate or polyisocyanate utilizing either of the above type catalysts.

While epoxy resins have remarkable utility and effectiveness as protective covering films for numerous applications, they do have one primary drawback of excessive cost, making their use prohibitive in a number of application areas. Attempts to "extend" the epoxy resins by mixing or reacting them with other materials to form a cheaper overall film generally results in loss of desired film properties. In particular, conjoint use of epoxy prepolymer resins and other materials reactive with the epoxies generally results either in loss of film strength or flexibility, compared to sole use of epoxy resins. In addition, other undesirable effects may be noted in using a modified epoxy resin such as loss of adhesiveness, prolonged cure time, decreased hydrolytic stability of films formed therefrom, poor outdoor weatherability, decreased impact resistance, and flame resistance, etc.

In view of the above, one of the principal objects of the present invention is to provide novel epoxy resins of materially reduced cost compared to conventional epoxy resins, but yet which still possess the advantages of the conventional epoxy resins and are not subject to the above and other drawbacks.

Another object of the present invention is to provide novel epoxy resin compositions capable of producing semi-rigid or flexible polymers, which nevertheless have the desired high level strength and hardness.

Still another object of the present invention is to provide the above described new and improved epoxy resin compositions which may also be adapted to both heat and air-dry curing techniques, and are susceptible to curing by a wide variety of catalytic curing agents.

Yet another object of the invention is to provide the above epoxy compositions which are capable of being further reacted with a number of reactive chemicals such as isocyanates or polyisocyanates to give films or coating compositions of various types, which may be so tailored to favor one or more specially desired properties.

A specific object of the invention is to provide low-cost epoxy resin compositions which after curing form coatings useful as insulating materials, as maintenance coatings for pipes and tank lines, etc., or which provide tightly adherent films attached to metal or other surface substrates.

Additional objects will appear hereinafter.

In accordance with the invention modified epoxy resin compositions have been discovered, which are of materially less cost than the conventional epoxy resins and yet possess the same advantages. In the broadest sense the epoxy resin compositions of the invention comprises the reaction product of a major amount of an epoxy resin and a minor amount of a carbohydrate polyether. These materials have been found to have their greatest utility when used as coatings or films. In contradistinction to many modified epoxy resins the compositions when applied to a substrate and cured thereon to form a coating or film result in polymeric coatings that are sufficiently flexible, but yet possess a high degree of strength. Thus, they are particularly useful as coatings in application where a metal or other substrate is to be formed or worked after coating, or where the coated article is dented and must be beaten out. Heretofore, in most instances, increasing flexibility of an epoxy coating composition in some manner has generally resulted in deleteriously affecting the hardness and solvent resistance of the films. Conversely, when hardness or the strength properties of the films are increased, the flexibility is generally proportionally diminished.

The coating compositions of the invention may be made up in a variety of ways, and applied to the substrate to be coated in a number of different manners. For example, the epoxy prepolymer or a partial resin, hereinafter further described, may be first partially reacted with the carbohydrate polyether, generally in presence of an organic solvent, and then applied to the substrate under treatment. Further polymerization of the two above materials is carried out by driving off the solvent to form a tough adherent film. Again, the epoxy resin and carbohydrate polyether may be merely mixed with or without benefit of solvation and applied to the substrate to give hard and fusable films upon the curing or reacting of the two ingredients. Also, the epoxy resinous composition and carbohydrate polyether, whether prepolymerized or not, may be cured upon the substrate to which they are applied by means of heat, or at ambient temperature, usually with the curing being promoted by addition of catalyst.

It has been positively demonstrated that an actual reaction takes place between the epoxy resin and carbohydrate polyether, whether such reaction is first initiated before application to the substrate, and then completed thereafter, or whether the copolymerization reaction takes place in a single step of coating and curing the mixture of ingredients. In particular, the just defined epoxy coating compositions in film form were subjected to both long-term and accelerated hydrolytic attack. In no instance was the carbohydrate polyether component of the resinous film leached out of the film, and the test waters after completion of the runs did not contain any residual carbohydrate polyether as determined by IR techniques.

The first ingredient making up the coating compositions of the invention is an epoxy resin. The uncured epoxy partial polymers of interest whether liquid or solid are generally those which have a sufficiently long molecular distance between the epoxy moieties. A general class adaptable in the present invention contains terminal epoxy moieties sufficiently far apart whereby the rigidity of the molecule does not detract from the desired balanced properties.

The epoxy, or epoxide resins, as they are variously called, which may be used in the invention generally comprise a polyether derivative of a polyhydric organic compound, that is, a polyhydric alcohol or phenol, which also contains epoxide groups. More often, these epoxy resins are the glycidyl ethers of polyphenols and polyalcohols. The resins may be obtained by reacting an epihalohydrin, for example, epichlorohydrin, and a phenol having at least two phenolic hydroxy groups, for example, bis-(4-hydroxy phenol)-dimethyl-methane. Generally, the epoxy resin contains more than one epoxy group per molecule, and more often from 1 to 2 or more epoxy groups per molecule and may be prepared by effecting reaction between epichlorohydrin and a polyhydroxy phenol or alcohol, for example, hydroquinone, resorcinol, glycerine, or condensation products of phenols with ketones, for instance, bis-(4-dihydroxydiphenyl)-2,2-propane.

Preferred polyhydric polynuclear phenols consist of 2 or more phenols connected by such groups as alkylene, ether, ketone or sulfone radicals. The connecting groups are further exemplified by the following compounds: bis(p - hydroxyphenyl) ether, bis(p - hydroxyphenyl) ketone, bis(p - hydroxyphenyl) methane, bis(p-hydroxyphenyl) dimethyl methane, bis(p-hydroxyphenyl) sulfone, or trisphenols or tetraphenols having the formulas:

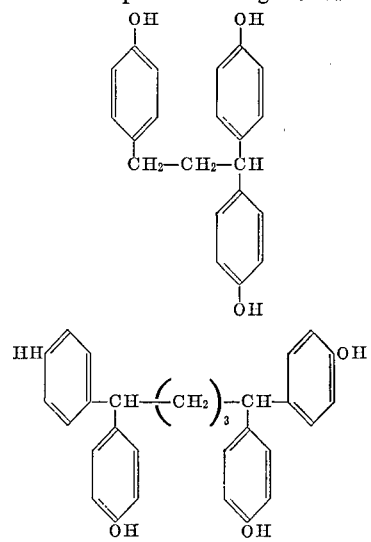

Preferred as the epihalohydrin for reaction with the above polyhydric phenols is epichlorohydrin or glycerol dichlorohydrin.

Among the suitable polyepoxides useful in the invention are the epoxy polyethers of polyhydric phenols obtained by reacting a polyhydric phenol with a halogen-containing epoxide in an alkaline medium. Suitable for example, are the polyethers obtained by reacting an excess of epichlorohydrin with 2,2-bis(4-hydroxyphenyl) propane (to obtain 2,2-bis(2,3-epoxypropoxyphenyl) propane), resorcinol, catechol, hydroquinone, methyl resorcinol, polynuclear phenols such as 2,2-bis(4-hydroxyphenol) butane, 4,4'-dihydroxybenzophenone, bis(4-hydroxyphenyl) ethane, 2,2-bis(4-hydroxyphenyl) pentane, and 1,5-dihydroxynaphthalene. Other halogen-containing epoxides are 3-chloro - 1,2 - epoxybutane, 3-bromo-1,3-epoxyhexane, 3-chloro-1,2-epoxyoctane, and the like.

Preferred polyepoxides are the glycidyl polyethers of dihydric phenols obtained by reacting epichlorohydrin and a dihydric phenol in an alkaline medium. The polymeric product is generally not a single simple molecule but a mixture of glycidyl polyethers.

As stated above, preferred epoxy resins useful in the invention are the polyglycidyl ethers of polyhydric phenols. Among the suitable di- and polynuclear phenols suitable for preparation of useful polyglycidyl ethers are the bisphenols, and polyphenols such as the Novolac condensation product of a phenol and a saturated or unsaturated aldehyde containing on an average of from 3 to 20 or more phenylol groups per molecule. Examples of suitable polyphenols derived from a phenol and an unsaturated aldehyde, such as acrolein are the triphenylols, pentaphenylols, and heptaphenylols. Generally, these polyglycidyl ethers or polyhydric phenols are prepared by the reaction of an epihalohydrin with a polyhydric phenol under basic conditions. The polyhydric phenol can be mononuclear such as resorcinol, or hydroquinone, or may be di- or polynuclear.

The chemical structure of the most preferred resins can be represented by the following formulae:

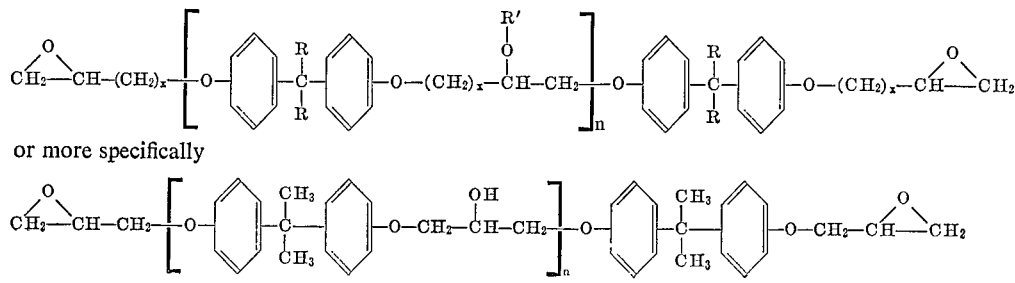

or more specifically

In the first formula above, R may be alkyl, of from about 1 to about 5 carbon atoms, R' may be H or alkyl of from 1 to 5 atoms; $x$ may be of from 1 to 4. The number "$n$" is related to the epoxy equivalent and is explained below.

The value of the epoxy equivalent is measured by the grams of resin containing one gram equivalent of epoxide. These values can vary from 140 to 4,000, with preferred ranges of about 225 to 2,000. Doubling the value of epoxy equivalent of materials falling within the just depicted formulae gives the approximate molecular weight.

The second ingredient in making up the epoxy resin coating compositions of the invention is a carbohydrate polyether. Materials of this type are formed by alkoxylating various types of carbohydrate units, which may or may not have already been partially derivatized. For example, useful in the invention are ethylene or propylene oxide adducts of monoacetone glucose, diacetone glucose, dextrose, corn syrup, butyl glucoside, propylene glycol glucoside, methyl glucoside, and other glycosides, starch, starch hydrolysis products, sucrose, maltose, high maltose syrups, cyclodextrins, etc.

Preferred polyethers are formed by reacting 1-60 and more often 2-40 moles of alkylene oxide per individual carbohydrate unit. Thus, for example, if starch or a starch hydrolysis product is being reacted, 1-60 moles of alkylene oxide such as ethylene oxide and propylene oxide are reacted per anhydroglucose unit. Preferred carbohydrate polyethers are those formed by reacting starch, a glycoside such as methyl glucoside and sucrose with appropriate amounts of alkylene oxide and most preferably propylene oxide.

The glycosides which are alkoxylated to form useful polyether glycosides are nonreducing monosaccharides in which an alkyl or aralkyl radical is attached to a carbonyl carbon atom through an oxygen atom. The term "nonreducing monosaccharide" denotes a simple sugar which does not reduce Fehling's solution. Thus, for example, the alkyl or aralkyl group present in the monosaccharide may be benzyl, methyl, ethyl, propyl, isopropyl, n-butyl, isobutyl, tertiary amyl, hexyl or 2-ethylhexyl. The sugar constituent of the glycoside is derived from a pentose, such as xylose, lyxose, arabinose or ribose; a hexose, such as glucose, mannose, altrose, talose, galactose, idose, gluose, fructose, allose, psicose, sorbose and tagatose; or a desoxy derivative formed by the replacement of a hydroxy substituent in the sugar with hydrogen such as the desoxyhexoses, rhamnose and fructose. The sugar constituent can be in the furanoside or pyranoside form of acetal structure.

Among the glycosides which can be employed are the alpha and beta forms of methyl-D-arabinoside, methyl-D-xyloside, ethyl-D-xyloside, n-butyl-D-riboside, methyl, ethyl, propyl, butyl, and 2-ethylhexyl-D-glucoside, 2-ethylhexyl-D-fructoside, isobutyl-D-mannoside, ethyl-D-galactoside, benzyl-D-glucoside and methyl-R-rhamnoside. The preferred glycosides are the alkyl glycosides and preferably the lower alkyl glycosides in which the alkyl group contains 1 to 6 carbon atoms. Of these, preferred are the methyl glycosides, and most preferably, propoxylated methyl glucoside.

The above-described glycosides which are used in the practice of the invention constitute a known class of materials. In general, the synthesis of glycosides may be accomplished by the Fischer method which involves reaction between simple sugars and the appropriate alcohol in the presence of an acid catalyst, or by methods based on the replacement of the halogen atom of tetraacetylglycosyl halides followed by saponification of the acetyl groups.

The glycosides which are employed may be a single compound of definite composition or a mixture of isomers. The glycoside polyethers such as the glucoside polyethers are obtained by reacting the above described glycoside compounds with an alkylene oxide, preferably ethylene oxide or propylene oxide or mixtures of these oxides. The reaction is well known, and is usually carried out by means of an alkaline catalyst such as potassium hydroxide in presence or absence of an inert solvent such as toluene, or other suitable hydrocarbon solvents. The products are usually mixtures which may be utilized as such or further refined to provide a discrete compound. As employed in the instant invention the alkoxylated glycosides usually have a molecular weight of about 400 to about 6000.

If the carbohydrate is derivatized to an insufficient extent, that is, contains an insufficient amount of polyether linkages, resultant films formed in conjunction with the above described epoxy resins do not have the desired flexibility. That is, the coating or film composition has too rigid a structure.

Experimentation has also proved that apparently similar aliphatic polyethers such as glycerine polyether when set into films along with the epoxy resin component yielded a final resulting coating composition having less strength than those formed from the instant compositions of the invention. While such films had sufficient flexibility, they nevertheless failed in the strength requirement.

Generally, due to the low cost of the carbohydrate polyether ingredient it is desirable to employ as much carbohydrate as is possible until it has been demonstrated that the epoxy film properties are beginning to be deleteriously affected. Generally, from about 5 to about 50% of carbohydrate polyether based on epoxy resin content may be employed in forming the reaction products of the invention. More often, 5-30% of carbohydrate is utilized, based on resin weight, and most preferred compositions contain 10-30% of carbohydrate based on resin.

In a particularly desired embodiment of the invention, films are formed which have also incorporated therein an isocyanate component. Again, the isocyanate, carbohydrate polyether and epoxy resin may be first prepolymerized in solution, and then applied to the substrate upon which a film is to be laid. Alternatively, these three ingredients may be merely mixed, and then polymerized upon the substrate in one step to form useful films. Also, the isocyanate may be added to an already reacted mixture of carbohydrate polyether and epoxy resin, and the entire mixture laid down on the substrate and cured to film form.

Illustrative examples of suitable isocyanates, and isothiocyanates, which may be employed in the invention are ethyl, methyl, propyl, butyl, amyl, octyl, decyl, dodecyl, hexadecyl, octadecyl, allyl, isobutyl, isoamyl, cyclohexyl, phenyl, p-tolyl, p-chlorophenyl, m-chlorophenyl, and α-naphthyl isocyanates, etc.; ethylene diisocyanate, trimethylene diisocyanate, tetramethylene diisocyanate, pentamethylene diisocyanate, etc.; and the corresponding diisothiocyanates; alkylene diisocyanates and diisothiocyanates, such as propylene - 1,2 - diisocyanate, butylene - 1,2 - diisocyanate, butylene - 1,3 - diisocyanate, butylene-2,3-diisocyanate, and butylene-1,3-diisothiocyanate; alkylidene diisocyanates and diisothiocyanates, such as ethylidine diisocyanate, butylidine diisocyanate and ethylidine diisothiocyanate; cycloalkylene diisocyanates and diisothiocyanates, such as cyclopentylene-1,3-diisocyanate, cyclohexylene-1,2-diisocyanate, cyclohexylene-1,3-diisocyanate, cyclohexylene - 1,4 - diisocyanate, and cyclohexylene-1,2-diisothiocyanate; cycloalkylidene diisocyanates and diisothiocyanates, such as cyclopentylidene diisocyanate, cyclohexylidene diisocyanate and cyclohexylidene diisothiocyanate; aromatic diisocyanates and diisothiocyanates, such as m-phenylene diisocyanate, p-phenylene diisocyanate, 1-methyl-2,4-phenylene diisocyanate, naphthylene-1,4-diisocyanate, diphenylene-4,4'-diisocyanate or p-phenylene diisothiocyanate; aliphatic-aromatic diisocyanates or diisothiocyanates, such as xylylene-1,4-diisocyanate, xylylene - 1,3 - diisocyanate, 4,4'-diphenylmethane diisocyanate, 4,4'-diphenylpropane diisocyanate or xylylene-1,4-diisothiocyanate.

Polyisocyanates containing more than two isocyanate groups may also be used. Illustrative of these is polymethylene polyphenyl isocyanate. A commercially available polyisocyanate is known as PAPI and has an average functionality between two and three. Thus, by the term "polyisocyanate" is meant a molecule containing two or more isocyanate groups.

The amount of isocyanate or polyisocyanate reacted with the polyether carbohydrate-epoxy resin prepolymer or to be coreacted with these two materials before any previous reaction of carbohydrate and epoxy resin may vary over a wide range depending upon the desired character of the resin. Specifically, depending upon whether properties of strength or flexibility are desired to predominate, the amount of isocyanate can be adjusted to achieve an over-balance of one property with respect to the other. In a typical case, the amount of isocyanate or polyisocyanate employed is from about 0.1 to about 8, and more often is 0.2 to about 2 equivalents per total equivalent of epoxy resin and polyether carbohydrate. Expressed on a weight basis suitable films or coatings are produced if the amount of isocyanate or isothiocyanate employed is 5–30% by weight of the epoxy resin present.

As mentioned above, the compositions of the invention may be cured in presence of heat with aid of conventional curing agents. Both acid and basic catalysts may be employed, though use of the latter is preferred. Thus, amine curing agents may be utilized as the following: diethylenetriamine, triethylenetetramine, tetraethylenepentamine, trimethylene diamine, mono and tridimethyl-amino methyl phenol, metaphenylene diamine, P,P'-methylene dianiline, piperidine, diethanolamine, etc. Other suitable amine hardeners include: dicyandiamide, melamine, pyridine, cyclohexylamine, benzyldimethylamine, benzylamine, diethylaniline, triethanolamine, tetramethyl piperazine, N,N-dibutyl-1,3-propane diamine, N,N-diethyl-1,3-propane diamine, 1,2-diamino-2-methyl propane, 2,7-diamino-2,6-dimethyloctane, dibutylamine, dioctylamine, dinonylamine, distearylamine, diallylamine, o-tolylnaphthylamine, pyrrolidine, 2-methylpyrrolidine, tetrahydropiperidine, diaminopyridine, tetramethyl pentamine and the like, and salts of these amines. Preferred basic catalysts are dimethyl aminomethyl phenol and tridimethyl aminomethyl phenol.

Again acid anhydrides such as the anhydrides of dibasic acids, e.g., succinic, maleic and phthalic acids are also used as curing agents. Phthalic acid derivatives which are substituted in the nucleus are also used here, as well as hydrogenated phthalic acids. Polymerized acid anhydrides, e.g., polyadipic and polysebacic acid anhydrides can likewise be employed.

Inorganic bases may also be used as catalysts to catalyze reaction between carbohydrate polyether and epoxy resin with or without further reaction of isocyanate. However, basic organic nitrogen compounds are preferred such as the above or others, such as quaternary ammonium hydroxides wherein at least one of the alkyl groups attached to the nitrogen atom contains between about 12 and about 18 carbon atoms. Weakly basic substances such as phenol-formaldehyde resins may also be employed. Lewis acids as aluminum chloride and boron trifluoride may also be utilized as catalysts.

The amount of curing catalyst which should be present to fulfill its intended role, may be widely varied according to the type of catalyst utilized. However, in most instances about 0.1–5.0% curing catalyst or hardener based on weight of epoxy resin is employed in practicing the instant invention.

The just-described compositions have utility in a number of useful areas. For example, they may be used as compounds for casting, in potting and encapsulation application, as sealants, adhesives, laminates, as moldings, as foams, as impregnants, as coatings, as filament windings, etc. As can be seen above, the epoxy resin-carbohydrate polyether reaction products are particularly useful as coating composition or film formers due to excellent flexibility and high strength.

Again, the substrate to which the epoxy resin-carbohydrate polyether compositions may be affixed can vary throughout a wide spectrum of materials. Exemplary are metals of all types as steel, glass, paper, wood, textiles, leather, flooring materials, e.g., vinyl tile, asbestos-vinyl tile, asphalt tile, masonry of all types, e.g., concrete, stone, brick, asbestos-cement shingles and siding, plastics, etc.

With specific regard to the coatings area, the compositions of the invention are especially useful in protecting structural masonry and steel work such as present in refineries, tanneries, breweries, laundries, etc. in coating storage tanks, plating shops, bar top varnishes, bridges, gas holders, meat vans, sewage works, etc. They are also useful in runway and roadway markings; as aircraft coatings, particularly jets, to resist the solvent action of hydraulic lubricants and to resist erosion at elevated temperatures and speeds; and as protective coatings on home appliances of all types.

The coatings are also useful as interior linings of static and mobile tanks and drums carrying fuels, solvents, oils, corrosive chemicals, foodstuffs, wine, beer, etc. The materials are especially suitable as interior linings since they both protect the storage vessel and prevent contamination of the stored product.

The epoxy coatings of the invention are especially useful to line the interior of tankers. Crude oil tankers alternately carry crude oil and salt water ballast and in the past heavy corrosion losses have resulted, with relatively early replacement of steel plates. The application of the epoxy coatings of the invention protect the steel of the tankers and prolong their life. In addition, they reduce repair costs due to renewal of corroded plates, heating coils and stringers. The smooth hard coatings also aid the ease and speed of cleaning of the tanks.

In special applications, the compositions may be used to encapsulate various objects such as, for example, electrical wires whereby an insulating coating is produced. Another area where a flexible yet strong coating is desired lies in treatment of substrates which are to be subsequently worked, such as by bending, etc. One particular concern here lies in coating of toothpaste tubes. Here the coatings must withstand repeated crushing and manipulation without cracking or peeling from the tube base.

The epoxy composition whether applied in solution, or emulsion form, or directly to the substrate to be treated without benefit of any solvent may be employed for a wide variety of other applications than those just described. For example, among the best applications are as a coated abrasive binder, a size for cloth, a paper stabilizer, a paper base laminate, a glass mat and preformed binder, etc.; as a wash and wear treatment for cotton or wool, as a wood chip binder, as a binder for paper used for battery separators, as a protective coating of all types, e.g., as automobile primers or unpigmented coatings on glass and steel, as binders for nonwoven textile, as decorative coatings for bottles, etc. The epoxy resin compositions may be used to form both pigmented and clear coatings. Thus, they may be first mixed and ground with iron oxides, barytes, talc, etc., and films cast therefrom.

The following examples illustrate typical preparations of compositions of the invention and their excellent performance as epoxy-type coatings. A member of different epoxy resins starting materials were employed as well as varying carbohydrate polyethers. Also, the films were tested for a variety of important properties.

The epoxy resins used as reactants with the carbohydrate polyethers can vary both in molecular weight and chemical composition. Some epoxy resins used in the instant work are characterized as set forth in Table I below.

TABLE I

| Number | Chemical composition | Epoxide equivalent | Molecular weight |
|---|---|---|---|
| I | Bisphenol A-epichlorohydrin | 173–197 | 340–350 |
| II | do | 179–194 | 340–400 |
| III | do | 445–520 | |
| IV | do | 350–400 | |
| V | do | 450–525 | 1,100 |
| VI | Polyglycol diepoxide | 175–205 | |
| VII | Bisphenol A-epichlorohydrin | 2,400–4,000 | 3,800 |

The above epoxy resins were mixed with several different carbohydrate polyethers and films cast on glass or tin plate using 50% solutions of the coatings. In some instances prepolymers of epoxy resins and carbohydrate polyethers were first prepared prior to casting films therefrom. The surfaces that were coated were first washed with water followed by a xylene wash.

The coatings as prepared above were then tested for properties deemed most important in the area of protective coatings. These tests are set forth below.

COMPATIBILITY

This test is essentially a visual one involving inspection of the coating after it has been dried or cured. If the coating, after it has set up, is clear and homogeneous, it is said to be compatible. However, if the coating produces a hazy or cloudy film, it is said to be incompatible. The incompatible systems exhibit poor film integrity and have poor overall characteristics compared to the compatible system.

ADHESION

Adhesion was measured by two methods, the scratch test and the scratch peel test. In the scratch test a knife of moderate sharpness is employed. Here, the edge of the knife is positioned parallel to the surface of the film and drawn over the film. A film with excellent adhesion will have a cut only the width of the blade. A film with poor adhesion will show flaking.

In the scratch peel test the film is first cut with a knife and the corner of the cut is then peeled back. The adhesion property is rated according to the amount of the film that can be peeled back. If it is rated excellent there is no peeling. Slight peeling but immediate breakage is given a rating of good. If adhesion is only rated fair, about half of the cut can be peeled away before breakage. If the film adhesion is rated as poor, the cut can be completely removed.

SWARD HARDNESS

Essentially this test consists of allowing a rocker of an approximate half-moon shape to be set in motion, and counting the number of oscillations which occur. This is repeated three or four times at different locations on the film to determine an average number of swings. The harder the film, of course, the greater the number of oscillations or swings. Usually the hardness is determined after the film has been sufficiently cured to be able to support the rocker without being marred. The film itself is applied to a 4 x 6 inch glass plate and is 0.003 inch thick.

FLEXIBILITY

In one test of this type, called the mandrel test, a coated tin plate, one inch wide, was bent over rods of varying diameters. The smaller the diameter of the rod, the more severe the bending test. It was then noted at what bend the coating cracked.

In the second test, called the T Bend test, a one inch wide tin plate was bent over upon itself at a 180° angle and squeezed together. The sample was then repeatedly bent until a thickness of bends was built up. The bend at which the film does not show cracking is used as a measure of T bendability. In this test $T_0$ is the lowest value assigned. The lower the value the better the indication of flexibility.

REVERSE IMPACT

Here, a two-pound steel rod is dropped from various heights upon a cured coated tin plate. Each time the rod is dropped, the film panel is examined for flaking, cracking or other evidence of adhesion loss. The higher one can drop the rod without visible damage to the coating, the better the properties of the cured film. In this particular investigation, testing was terminated at the 30 inch-pounds level.

SOLVENT RESISTANCE

The test samples are subjected to exposure to water or other solvents and evaluated for loss of adhesion, blushing or whitening, blistering and adhesion recovery. The samples are then rated excellent or completely unaffected; good, that is they lost adhesion but recovered; fair, exhibiting lost adhesion and some blistering or blushing, and did not recover adhesion; and poor, that is, they lost adhesion, exhibited severe blistering or blushing, and did not recover adhesion.

The following examples illustrate typical compositions of the invention, and their excellent properties as protective coatings.

EXAMPLE I

In this series of runs the Epoxy Resin V of Table I was dissolved in a xylene-methyl isobutyl ketone solvent in a 1 to 1 volume ratio of solvent to resin. Several carbohydrate polyethers (formed by reacting the carbohydrate with different amounts of propylene oxide) and diethylenetriamine catalyst were then added respectively to aliquots of the epoxy resin solution. Nine parts of carbohydrate polyether per 100 parts of epoxy resin were added, and then 3-mil films were cast on glass and tin plates from solutions containing approximately 60% of solids. The films were air dried 10 minutes and oven cured at 150° C. for one hour. Characteristics of these films are listed below. As is readily apparent the films produced from the resinous compositions of the invention particularly had excellent strength and flexibility, as well as other desirable properties.

TABLE II

| Carbohydrate polyethers | Hydroxyl number | Sward hardness | Reverse impact (pounds) | Flexibility ⅛" mandrel | Resistance to methyl ethyl ketone, 24 hours immersion | Resistance to hot water, 30 minute immersion |
|---|---|---|---|---|---|---|
| High maltose corn syrup polyether | 480 | 47 | >30 | Passed | Good | |
| Starch polyether, acid hydrolysis product | 516 | 31 | >30 | do | do | Good |
| Control (unmodified epoxy resin) | | 51 | >30 | do | do | Do. |

EXAMPLE II

In this example Epoxy Resin V was dissolved in a solution containing equivalent volumes of xylene and isopropyl alcohol to a 50% total solids. The propoxylated carbohydrates were added as solutions from the same solvent system. The catalyst employed was diethylenetriamine in an amount of 6 parts per hundred parts of epxoy resin. The coated films were air dried for two minutes and then oven dried at 105° C. for 15 minutes. Properties of these films are listed below.

TABLE III

| Carbohydrate polyether | Hydroxyl number | Percent carbohydrate polyether based on resin weight | Adhesion | Flexibility (T bend test) | Reverse impact (pounds) | Sward hardness |
|---|---|---|---|---|---|---|
| Control, unmodified epoxy resin | | | Excellent | $T_0$ | Greater than 30 | 60 |
| Methyl glucoside polyether | 463 | 10 | do | $T_0$ | do | 64 |
| Do | 463 | 20 | do | $T_0$ | do | 74 |
| Do | 463 | 30 | do | $T_0$ | do | 50 |
| Starch polyether, acid hydrolysis product | 516 | 10 | do | $T_0$ | do | 62 |
| Do | 516 | 20 | do | $T_0$ | do | 53 |
| Do | 516 | 30 | do | $T_0$ | do | 54 |

Again, as is evidenced above, the films formed from the compositions of the invention exhibited excellent flexibility and hardness, and as well, tightly adhered to the glass plates.

EXAMPLE III

In these tests Epoxy Resin V of Table I was dissolved to a 50% total solids in a xylene-isopropyl solvent system. Various propylene oxide adducts of carbohydrates weer added as solutions of the same solvent system. The catalyst in this case consisted of 2 parts of diethylenetriamine per 100 parts of resin and 10 parts of N,N dimethylbenzylamine per 100 parts of resin. The films were air dried for 1 minute and oven cured for 15 minutes at 105° C. Results appear below.

TABLE IV

| Carbohydrate polyether | Hydroxyl number | Percent carbohydrate polyether | Adhesion | Sward hardness | Flexibility, T bend test | Flexibility, reverse impact test |
|---|---|---|---|---|---|---|
| Control, unmodified epoxy resin | | | Excellent | 71.2 | $T_0$ | Greater than 30. |
| Methyl glucoside polyether | 463 | 10 | do | 66.2 | $T_1$ | Do. |
| Do | 463 | 20 | do | 66.2 | $T_0$ | Do. |
| Do | 463 | 30 | do | 54.6 | $T_0$ | Do. |
| Do | 463 | 40 | do | 39.0 | $T_0$ | Do. |
| Starch polyether, acid hydrolysis product | 516 | 10 | do | 71.9 | $T_0$ | Do. |
| Do | 516 | 20 | do | 62.2 | $T_0$ | Do. |
| Do | 516 | 30 | do | 45.0 | $T_0$ | Do. |

In addition, the above films were also subjected to methyl ethyl ketone attack for 24 hours, additional solvent attack by toluene for 24 hours and subjection to boiling water for 30 minutes. In each case the films had excellent resistance to the solvents in the various immersion tests.

EXAMPLE IV

In this series of runs Epoxide Resin VII of Table I was employed. The general procedure listed in Example I was followed with the exception that the films were oven cured for 30 minutes at 177° C. Test results are as follows.

TABLE V

| Carbohydrate polyether | Hydroxy number | Percent carbohydrate polyether based on resin | Adhesion | Sward hardness |
|---|---|---|---|---|
| Control, unmodified epoxy resin. | | | Excellent | 48 |
| Methyl glucoside polyether. | 463 | 10 | do | 57.2 |
| Do | 463 | 20 | do | 55.2 |
| Do | 463 | 30 | do | 57.2 |
| Do | 463 | 40 | do | 31.2 |
| Starch polyether, acid hydrolysis product. | 516 | 10 | do | 61.2 |
| Do | 516 | 20 | do | 59.2 |
| Do | 516 | 30 | do | 47.2 |
| Do | 516 | 40 | do | 41.2 |

EXAMPLE V

In these tests, films of the invention were prepared and subjected to various solvents as listed below. All tests were immersion tests with exception of test involving acetic acid which was spotted on the test plate. The films all had solvent resistances at least equal to the control or unmodified epoxy resin film.

TABLE VI

| Carbohydrate polyether* | Percent carbohydrate polyether based on resin | Boiling water, 30 minutes | Chloroform, 1 hour | Acetic acid 15 Minutes Spot Test | Methyl ethyl ketone, 24 hours | Toluene, 24 hours |
|---|---|---|---|---|---|---|
| Methyl glucoside polyether | 10 | Good | Good | Excellent | Good | Good. |
| Do | 20 | do | do | do | do | Do. |
| Do | 30 | do | do | do | do | Do. |
| Do | 40 | do | do | do | do | Do. |
| Starch polyether, acid hydrolysis product | 10 | | do | do | do | Do. |
| Do | 20 | | do | do | do | Do. |
| Do | 30 | | do | do | do | Do. |
| Do | 40 | | do | do | do | Do. |
| Control, unmodified epoxy resin | | Good | Excellent | do | do | Do. |

*Formed from propylene oxide.

EXAMPLE VI

In this example the compositions of the invention were cured using two different curing agents. Specifically, in one case oxalic acid was used as the curing agent, and the cure was effected for 1 hour at 177° C. In the second case, phthalic anhydride was employed as the curing agent, and the cure was effected for 2 hours at 177° C. In all cases, the epoxy resin used was Epoxy Resin V from Table I. As is shown below, the films still exhibited excellent properties regardless of the source of the curing agent. This illustrates the versatility of the compositions of the invention in their capability of being cured with both acid and basic curing agents of varying types.

TABLE VII

| Carbohydrate polyether* | Percent | Curing agent | Parts curing agent per 100 parts resin | Adhesion | Sward hardness | Flexibilty T bend test | Flexibility, reverse impact test |
|---|---|---|---|---|---|---|---|
| Control, unmodified epoxy resin | | Oxalic acid | 12 | Excellent | 55.3 | $T_0$ | Greater than 30. |
| Methyl glucoside polyether | 10 | do | 12 | do | 51.3 | $T_0$ | Do. |
| Control, unmodified epoxy resin | | Phthalic anhydride | 12 | do | 64.6 | | |
| Methyl glucoside polyether | 10 | do | 6 | do | 62.6 | | |
| Do | 10 | do | 12 | do | 68 | | |

*Formed from propylene oxide.

EXAMPLE VII

In this series of runs an epoxy resin and various propoxylated carbohydrates were further combined with toluene diisocyanate, and the entire mixture polymerized and cast to form films.

Specifically, Epoxy Resin V was dissolved in 1000 ml. of methyl isobutyl ketone to make up a 24.5% epoxy resin solution. The following formulations were first prepared by admixture with the above solution. 30 grams of each of the above mixtures were then catalyzed with 1.0 gram of N,N-dimethyl benzylamine and 3-mil films were then cast on glass. The films were air cured for 5 minutes, cured in an oven at 115° C. for 30 minutes and tested for hardness.

TABLE VIII

| Carbohydrate polyether | Ingredient, weight percent | | | Sward hardness |
|---|---|---|---|---|
| | Carbohydrate polyether | Epoxy resin | Isocyanate | |
| Dextrose polyether | 29.0 | 48.2 | 22.8 | 63 |
| Methyl glucoside polyether | 32.0 | 47.2 | 20.8 | 46 |
| Methyl glucoside polyether hydrolysis product | 19.0 | 63 | 18.0 | 68 |
| Starch polyether | 11.0 | 82.0 | 7.0 | |

The above test films were also subjected to solutions containing 20% sulphuric acid and 20% sodium hydroxide for a period of 24 hours. In each instance the coatings had good resistance to both acid and base. Furthermore, the films were but slightly affected by subjection to a methylethyl ketone immersion for a period of 24 hours. The three component system films were slightly superior to similar films prepared using only the carbohydrate polyether and epoxy resin components. Specifically, the three-component systems had enhanced hardness and chemical resistance to various solvents compared to the two-component system.

It is also believed that the reaction products of epoxy resins and unmodified carbohydrates are novel. Again, these products have application for a number of uses including those just mentioned for the epoxy resin-carbohydrate polyether systems. Particularly preferred carbohydrates used to form excellent coating compositions as reactants with the epoxy resins include monoacetone glucose, butyl glucoside, sucrose, methyl glucoside, diacetone glucose, xylose, dextrose, glycerin glucoside, methyl xyloside, and propylene glycol glucoside. Preferred of these are monoacetone glucose, methyl glucoside, propylene glycol glucoside, and glycerin glucoside.

The following examples illustrate reactions of epoxy resins and various carbohydrates.

EXAMPLE VIII

A mixture of 97 grams of methyl glucoside (0.5 equivalent) and 95 grams of Epoxy Resin VI of Table I (0.5 equivalent) was heated with stirring to 130° C. After addition of 2.0 grams of potassium hydroxide, the exothermic reaction caused the temperature to rise slowly to 150° C. over a ten minute period. Thereafter, the temperature rose rapidly to about 190° C., at which time the reaction mixture was cooled to 150° C. and maintained at this temperature for two hours. The resultant product was homogeneous, and had a clear amber color. The melting point was 58–68° C.

EXAMPLE IX

The procedure of Example VIII was substantially followed with the exception that the epoxy resin reactant was Epoxy Resin II in this instance. The product in this run melted at 97–110° C.

EXAMPLE X

A mixture of 48.5 grams of methyl glucoside (0.25 equivalent) and 87 grams of Epoxy Resin I of table I (0.5 equivalent) was heated to 130° C. at which time two grams of potassium hydroxide were added. The temperature rose gradually to about 150° C. and then rapidly to 210° C. The reaction product was a homogeneous solid which had a melting point in excess of 300° C.

EXAMPLE XI

A mixture of 65 grams of diacetone glucose and 93 grams of Epoxy Resin II was heated to 130° C. Then 1.0 gram of potassium hydroxide was added and the temperature raised to 160° C. The temperature was maintained at this point for three hours. The product was a homogeneous solid at room temperature.

EXAMPLE XII

A mixture of 50 grams of monoacetone glucose and 84 grams of Epoxy Resin II was heated to 165° C. To the homogeneous solution was added one gram potassium hydroxide and after about two minutes duration the reaction temperature rose rapidly to 245° C. The reaction product was then cooled to room temperature at which point the product was a solid.

It is understood, of course, that the sources of epoxy resin and carbohydrate polyether may be substantially pure or be reacted in form of relatively impure sources. For example, a source of a particular polyether such as methyl glucoside polyether may contain as little as 50% or so pure methyl glucoside polyether and be accompanied by numerous byproducts. Use of these impure sources of polyethers are encompassed within the scope of the invention, and, in fact may be preferred from the standpoint of economics.

While the invention has been described in connection with specific embodiments thereof, it will be understood that it is capable of further modification. Further, this application is intended to cover any variations, uses, or adaptations of the invention following, in general, the principles of the invention, including such departures from the present disclosure as come within known or customary practice in the art to which the invention pertains, and as may be applied to the essential features hereinbefore set forth, and as fall within the scope of the invention.

The invention is hereby claimed as follows:

1. An epoxy resin composition comprising the reaction product of a major amount of an epoxy resin containing at least one vicinal epoxy group and a minor amount of an alkoxylated carbohydrate.

2. The composition of claim 1 wherein said alkoxylated carbohydrate is derived by reacting 1-60 moles of an alkoxylating agent per mole of carbohydrate unit.

3. An epoxy resin coating composition comprising the reaction product of an epoxy resin containing at least one vicinal epoxy group and a minor proportion, more than 5 weight percent, of an alkoxylated carbohydrate based on said epoxy resin weight, said composition being further characterized as being sufficiently flexible when cured while still possessing a high degree of strength.

4. The composition of claim 3 wherein said alkoxylated carbohydrate is derived by reacting 1-60 moles of an alkoxylating agent per mole of carbohydrate unit.

5. An epoxy resin coating composition comprising the reaction product of an epoxy resin containing at least one vicinal epoxy group, a minor proportion, more than 5 weight percent, of an alkoxylated carbohydrate and an amount of an isocyanate falling within the range from about 0.1 to about 8 equivalents per total equivalent of epoxy resin and alkoxylated carbohydrate, said composition being further characterized as being sufficiently flexible when cured while still possessing a high degree of strength.

6. The composition of claim 5 wherein said isocyanate is a polyisocyanate.

7. An epoxy resin coating composition comprising the reaction product of an epoxy resin containing at least one vicinal epoxy group and a minor proportion, more than 5 weight percent, of a propoxylated methyl glucoside, derived by reacting 1-60 moles of propylene oxide per mole of methyl glucoside, based on said epoxy resin weight, said composition being further characterized as being sufficiently flexible when cured while still possessing a high degree of strength.

8. An epoxy resin coating composition comprising the reaction product of an epoxy resin containing at least one vicinal epoxy group and a minor proportion, more than 5 weight percent, of a starch polyether derived by reacting 1-60 moles of an alkoxylating agent per mole of anhydroglucose unit present in said starch, based on said epoxy resin weight, said composition being further characterized as being sufficiently flexible when cured while still possessing a high degree of strength.

9. An epoxy resin coating composition comprising the reaction product of an epoxy resin containing at least one vicinal epoxy group and a minor proportion, more than 5 weight percent, of a sucrose polyether, derived by reacting 1-60 moles of an alkoxylating agent per mole of sucrose, based on said epoxy resin weight, said composition being further characterized as being sufficiently flexible when cured while still possessing a high degree of strength.

10. An epoxy resin coating composition comprising the reaction product of an epoxy resin containing at least one vicinal epoxy group and a minor proportion, more than 5 weight percent, of a propoxylated methyl glucoside derived by reacting 1-60 moles of propylene oxide per mole of methyl glucoside, based on said epoxy resin weight and a compound selected from the group consisting of an isocyanate and a polyisocyanate, said composition being further characterized as being sufficiently flexible when cured while still possessing a high degree of strength.

11. An epoxy resin coating composition comprising the reaction product of an epoxy resin containing at least one vicinal epoxy group and a minor proportion, more than 5 weight percent, of a starch polyether, derived by reacting 1-60 moles of an alkoxylating agent per mole of anhydroglucose unit present in said starch, based on said epoxy resin weight and a compound selected from the group consisting of an isocyanate and a polyisocyanate, said composition being further characterized as being sufficiently flexible when cured while still possessing a high degree of strength.

12. An epoxy resin coating composition comprising the reaction product of an epoxy resin containing at least one vicinal epoxy group and a minor proportion, more than 5 weight percent, of a sucrose polyether, derived by reacting 1-60 moles of an alkoxylating agent per mole of carbohydrate unit present in said sucrose, based on said epoxy resin weight and a compound selected from the group consisting of an isocyanate and a polyisocyanate.

13. An epoxy resin coating composition comprising the reaction product of an uncured thermosetting epoxy partial polymer comprising a glycidyl polyether of a polyhydric organic compound in which the polyhydric organic compound is selected from the group consisting of polyhydric alcohols and polyhydric phenols, and a minor proportion, more than 5 weight percent, of a carbohydrate polyether, derived by reacting 1-60 moles of an alkoxylating agent per mole of carbohydrate unit present, based on said epoxy partial polymer weight, said composition being further characterized as being sufficiently flexible when cured while still possessing a high degree of strength.

14. The composition of claim 13 wherein said carbohydrate polyether is a propoxylated methyl glucoside.

15. An epoxy resin coating composition comprising the reaction product of an epoxy resin, derived by reacting 4,4'-isopropylidenediphenol with epichlorohydrin, and a minor proportion, more than 5 weight percent, of a carbohydrate polyether, derived by reacting 1-60 moles of an alkoxylating agent per mole of carbohydrate unit present, based on said epoxy resin weight, said composition being further characterized as being sufficiently flexible when cured while still possessing a high degree of strength.

16. The composition of claim 15 wherein said carbohydrate polyether is a methyl glucoside polyether.

17. An epoxy resin coating composition comprising the reaction product of an epoxy resin, derived by reacting 4,4'-isopropylidenediphenol with epichlorohydrin a minor proportion, more than 5 weight percent, of a propoxylated methyl glucoside and an amount of a compound selected from the group consisting of an isocyanate and a polyisocyanate falling within the range from about 0.1 to about 8 equivalents per total equivalent of epoxy resin and propoxylated methyl glucoside, said composition being further characterized as being sufficiently flexible when cured while still possessing a high degree of strength.

18. The process which comprises forming a mixture of the ingredients of claim 1 and heating said mixture for a time and at a temperature sufficient to effect curing thereof.

19. The process which comprises forming a mixture of the ingredients of claim 7 and heating said mixture for a time and at a temperature sufficient to effect curing thereof.

20. The process which comprises forming a mixture of the ingredients of claim 8 and heating said mixture for a time and at a temperature sufficient to effect curing thereof.

21. The process which comprises forming a mixture of the ingredients of claim 9 and heating said mixture for a time and at a temperature sufficient to effect curing thereof.

22. The process of claim 18 wherein said curing is effected by addition of a basic catalyst selected from the group consisting of dimethyl aminomethyl phenol and tridimethyl aminomethyl phenol.

23. A substrate having deposited thereon a cured film of the composition of claim 1, said film being characterized as hard, but yet flexible.

24. A substrate having deposited thereon a cured film of the composition of claim 5, said film being characterized as hard, but yet flexible.

25. A substrate having deposited thereon a cured film of the composition of claim 7, said film being characterized as hard, but yet flexible.

26. A substrate having deposited thereon a cured film of the composition of claim 8, said film being characterized as hard, but yet flexible.

27. A substrate having deposited thereon a cured film of the composition of claim 15, said film being characterized as hard, but yet flexible.

28. A substrate having deposited thereon a cured film of the composition of claim 16, said film being characterized as hard, but yet flexible.

29. A composition comprising the reaction product of an epoxy resin containing more than one vicinal epoxy group and a minor proportion, more than 5 weight percent, of an alkoxylated carbohydrate based on epoxy resin weight.

30. A composition comprising the reaction product of a major amount of an uncured thermosetting epoxy partial polymer, comprising a glycidyl polyether of a polyhydric organic compound in which the polyhydric organic compound is selected from the group consisting of polyhydric alcohols and polyhydric phenols, and a minor amount, more than 5 weight percent, of an alkoxylated carbohydrate.

31. A composition comprising the reaction product of a major amount of an epoxy resin, derived by reacting 4,4'-isopropylidenediphenol with epichlorohydrin, and a minor amount, more than 5 weight percent, of an alkoxylated carbohydrate.

32. A substrate having deposited thereon a cured film of a composition comprising the reaction product of a major amount of an epoxy resin containing at least one vicinal epoxy group and a minor amount, more than 5 weight percent, of an alkoxylated carbohydrate selected from the group consisting of polyethers of monoacetone glucose, butyl glucoside, sucrose, methyl glucoside, diacetone lucose, xylose, dextrose, glycerine glucoside, methyl xyloside, and propylene glycol glucoside.

33. A composition comprising the reaction product of a major amount of an epoxy resin containing at least one vicinal epoxy group and a minor amount, more than 5 weight percent, of an alkoxylated carbohydrate selected from the group consisting of polyethers of monoacetone glucose, butyl glucoside, sucrose, metyl glucoside, diacetone glucose, xylose, dextrose, glycerine glucoside, methyl xyloside, and propylene glycol glucoside.

34. A composition comprising the reaction product of a major amount of an epoxy resin containing at least one vicinal epoxy group and a minor amount, more than 5 weight percent, of an alkoxylated high maltose starch syrup.

35. A composition comprising the reaction product of a major amount of an epoxy resin containing at least one vicinal epoxy group and a minor amount, more than 5 weight percent, of an alkoxylated starch hydrolysis product.

References Cited

UNITED STATES PATENTS

| | | | |
|---|---|---|---|
| 3,060,687 | 10/1962 | Mosher et al. | 260—9 |
| 3,085,085 | 4/1963 | Wismer et al. | |
| 3,145,191 | 8/1964 | Perfetti | 260—9 |
| 3,149,085 | 9/1964 | Ball et al. | 260—9 |
| 3,165,508 | 1/1965 | Otey et al. | |
| 3,265,641 | 8/1966 | Wismer et al. | |
| 3,277,213 | 10/1966 | Fuzesi | 260—9 |
| 3,324,108 | 6/1967 | Moller et al. | |

FOREIGN PATENTS 6,613,945  4/1967  Netherlands.

WILLIAM H. SHORT, Primary Examiner

E. WOODBERRY, Assistant Examiner

U.S. Cl. X.R.

117—124, 132, 138.8, 142, 148, 155; 260—2.5, 47, 77.5